US007165395B2

(12) United States Patent
Anderson et al.

(10) Patent No.: US 7,165,395 B2
(45) Date of Patent: Jan. 23, 2007

(54) SEMI-ACTIVE RIDE CONTROL FOR A MOBILE MACHINE

(75) Inventors: Eric Richard Anderson, Galena, IL (US); Russell Arthur Schneidewind, Chicago, IL (US); William Daniel Robinson, Epworth, IA (US); Daniel Lawrence Pflieger, East Dubuque, IL (US); Daniel Warren Williams, Dubuque, IA (US)

(73) Assignee: Deere & Company, Moline, IL (US)

( * ) Notice: Subject to any disclaimer, the term of this patent is extended or adjusted under 35 U.S.C. 154(b) by 59 days.

(21) Appl. No.: 11/056,684

(22) Filed: Feb. 11, 2005

(65) Prior Publication Data

US 2006/0179831 A1 Aug. 17, 2006

(51) Int. Cl.
*F16D 31/02* (2006.01)
*F15B 21/08* (2006.01)
*F15B 11/044* (2006.01)

(52) U.S. Cl. .......................................... 60/413; 60/468

(58) Field of Classification Search .................. 60/413, 60/468

See application file for complete search history.

(56) References Cited

U.S. PATENT DOCUMENTS 5,048,296 A * 9/1991 Sunamura et al. ............ 60/468
5,733,095 A * 3/1998 Palmer et al. ................ 60/413
6,938,413 B2 * 9/2005 Harnischfeger ............. 60/413

* cited by examiner

*Primary Examiner*—Igor Kershteyn

(57) ABSTRACT

A system and method of achieving ride control for a work vehicle that replaces a traditional accumulator with a ride control valve, a directional control valve and a fluid pressure source. The fluid pressure source may be a variable displacement hydraulic pump. The ride control valve is set to a first relief pressure that allows fluid to flow from the head end of a hydraulic cylinder when the loading on the cylinder, i.e., the pressure in the head end is equal to or greater than the first relief pressure. A work tool of the vehicle falls from a first position to a second position when fluid flows from the head end. The ride control valve is then reset to a second relief pressure, higher than the first relief pressure and sufficient to move the work tool toward the first position. Afterwards, the directional control valve is opened long enough to allow fluid from the fluid pressure source to enter the head end and move the work tool back to approximately the first position. The ride control valve may be dynamically adjusted.

32 Claims, 6 Drawing Sheets

SEMI-ACTIVE RIDE CONTROL FOR A MOBILE MACHINE

FIELD OF THE INVENTION

The invention relates to ride control for a work vehicle. In particular, it relates to shock absorption by a hydraulic cylinder that manipulates a work tool on a work vehicle.

BACKGROUND OF THE INVENTION

As work vehicles move along the ground, roughness of the terrain may cause roughness in vehicle ride. A rigid mechanical relationship between the vehicle frame and the working portion of the vehicle which includes the work tool and any linkage between the work tool and the vehicle tends to increase shock loading to the vehicle and, thereby, increase the roughness of the vehicle ride. Ride control systems for four wheel drive loaders are common and usually include a valve that connects a boom cylinder to an accumulator where the accumulator, ultimately, acts as a shock absorber. All are designed to provide flexibility and to absorb shock loading between the working portion of the vehicle and the vehicle frame, thereby, increasing the comfort of the vehicle operator and improving vehicle stability. However, such systems are complex, expensive and bulky, i.e., they require a substantial amount of space on the vehicle.

SUMMARY OF THE INVENTION

As stated above, ride control systems commonly used in work vehicles are, generally, complex, expensive and bulky. Additionally, such systems are generally limited in performance and must be attuned towards operation with either an empty or a loaded bucket (i.e., a light or a heavy tool) but not both.

Described herein, is a system and method of achieving ride control without expensive, complex and bulky components such as, for example, conventional accumulators. Additionally, the system and method described may be optimized over the entire range of operating conditions for the work vehicle. In the invention, a valve system including a proportional relief valve and solenoid valve plumbed in parallel with an electrohydraulic directional control valve controls a hydraulic cylinder that manipulates the work tool. The proportional relief valve connects the head end of the hydraulic cylinder to a fluid reservoir and the solenoid valve connects the rod end of the cylinder to the fluid reservoir. A controller directs controlling signals to the solenoid valve and the electrohydraulic directional control valve.

BRIEF DESCRIPTION OF THE DRAWINGS

Embodiments of the invention will be described in detail, with references to the following figures, wherein.

DESCRIPTION OF THE PREFERRED EMBODIMENT

Figure 1:
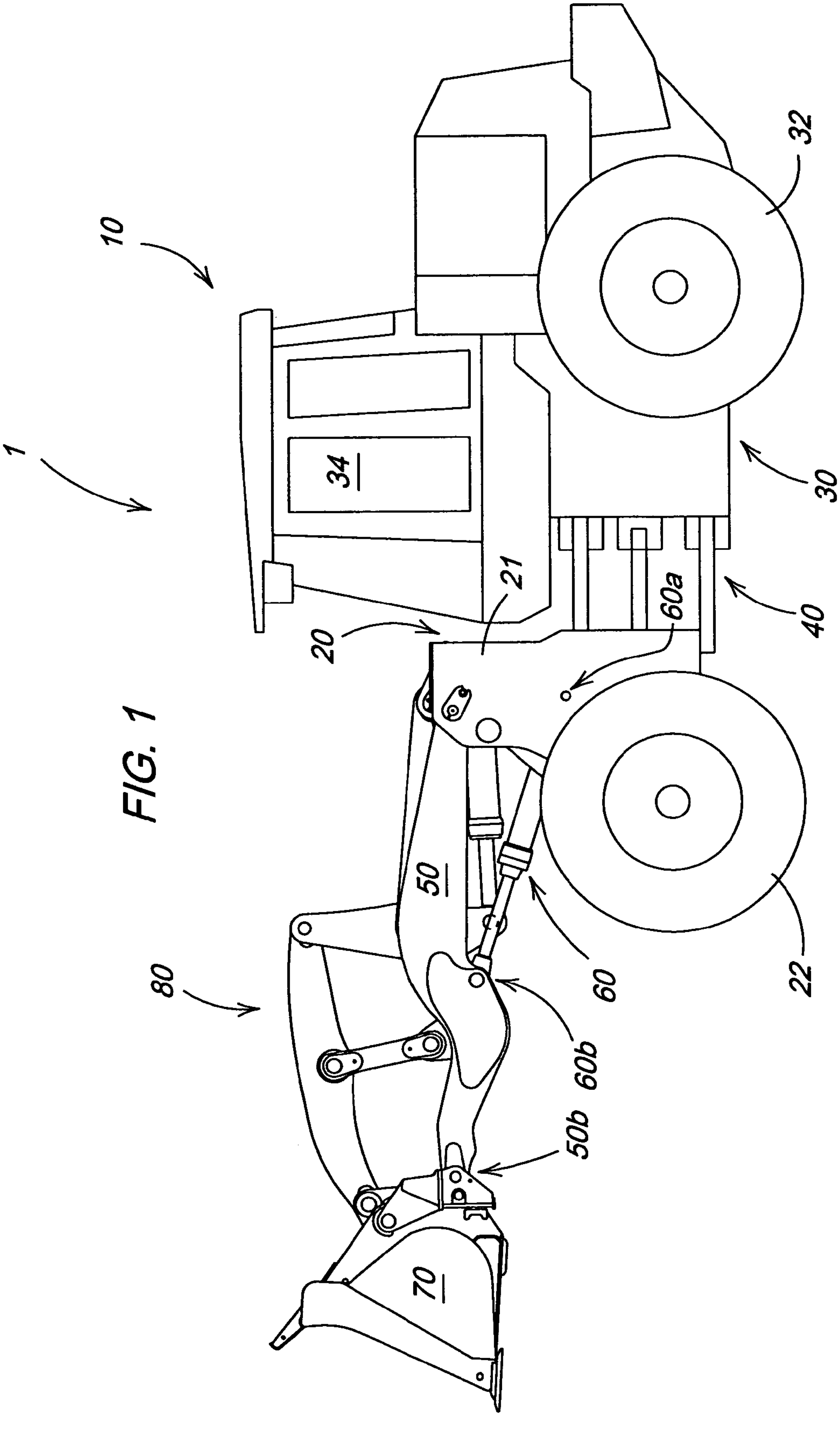
FIG. 1 is a side view of an exemplary embodiment of a vehicle equipped with the invention.

FIG. 1 is a side view of an exemplary embodiment of a work vehicle 1 employing the invention. The particular work vehicle 1 illustrated in FIG. 1 includes a frame 10 which includes a cab 34, a front frame portion 20, a rear frame portion 30, front wheels 22, rear wheels 32, a work tool 70, a boom 50 and a hydraulic cylinder 60 pivotally connected to the front frame portion 20 at pivot point 60 and pivotally connected to the boom at pivot point 60*a*. The front and rear wheels 22 and 32 propel the work vehicle 1 along the ground in a manner well known in the art.

As can be seen in FIG. 1, when the hydraulic cylinder 60 is supporting a load from the boom 50 without the aid of ride control, the boom 50 and the hydraulic cylinder 60 are positionally rigid with respect to the front frame portion 20. Thus a weight of the boom 50 as well as the linkage 80 and the work tool 70 is supported at a relatively rigid or fixed position with respect to the front frame portion 70, adding to a gravitational load experienced by the front wheels 22 and providing a new center of gravity due to that gravitational load. The rigidity of the boom 50 with respect to the front frame portion 20 has the effect of making the boom 20 an equivalent rigid portion of the front frame portion 20. This particular arrangement can cause roughness in the ride of the vehicle 1 as well less stable handling as the vehicle 1 travels along rough terrain at speed.

Figure 2:
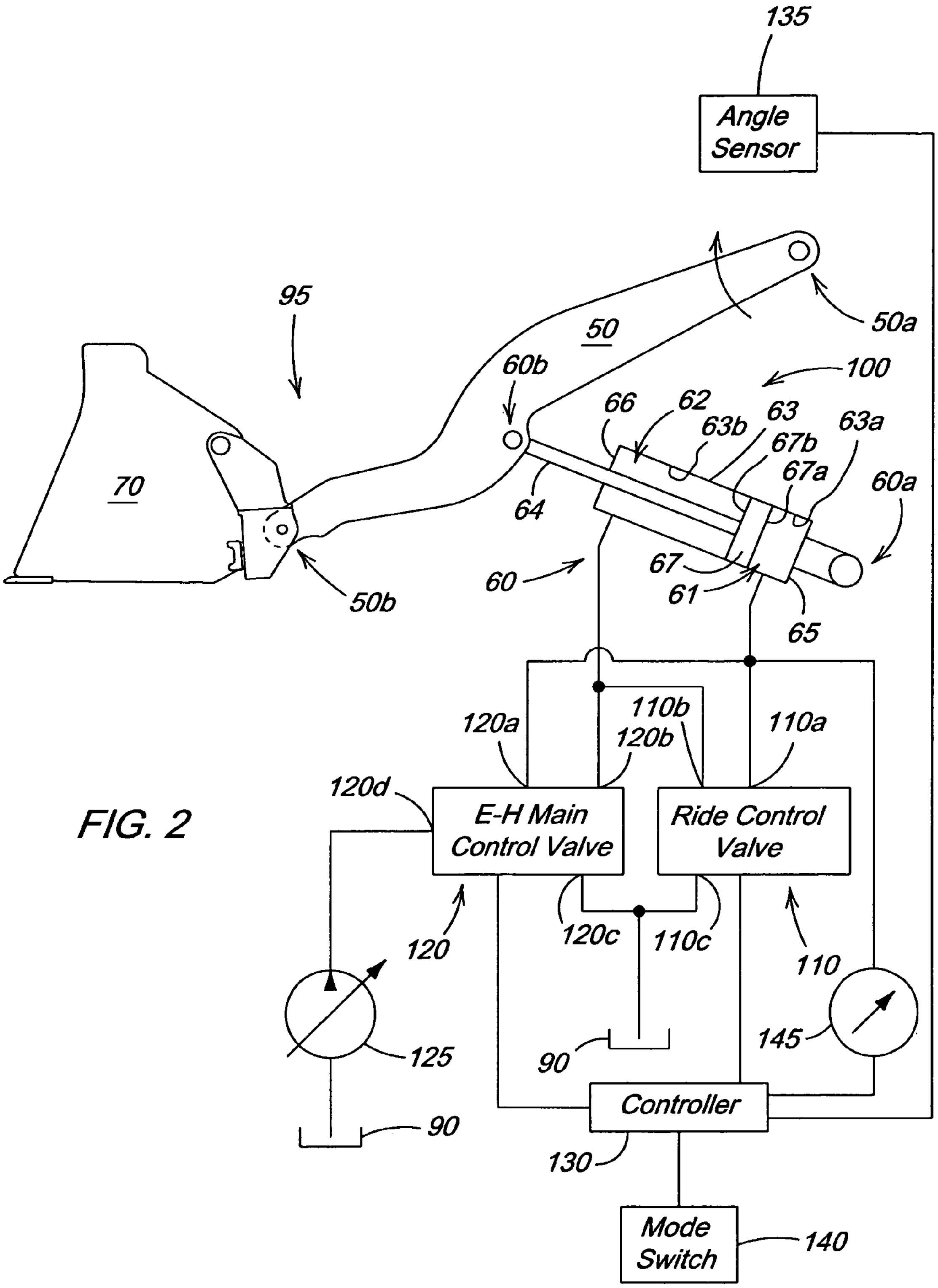
FIG. 2 is an illustration of an exemplary embodiment of the invention.

FIG. 2 is a schematic of an exemplary embodiment of a circuit 100 for the invention. The circuit 100 includes: a hydraulic cylinder 60, a ride control valve 110, an electro-hydraulic (E-H) main control valve 120, a hydraulic pump 125, a controller 130, a mode switch 140 having at least a first mode switch state and a second mode switch state, and a load 95 which, in this case, includes at least the boom 50 and the work tool 70. A weight of the load 95 may be increased by adding material to be transported to the work tool 70.

The hydraulic cylinder 60 includes a piston 67 with a first piston surface 67*a* and a second piston surface 67*b*, a rod 64, a piston side 61, a rod side 62, a cylindrical wall 63, a first end wall 65 and a second end wall 66. The piston side 61 includes the first surface 67*a* the first end wall 65 and a first cylindrical portion 63*a* of the cylindrical wall 63 between the first piston surface 67*a* and the first end wall 65. The rod side 52 includes the second piston surface 67*b*, the second end wall 66 and a second cylindrical portion 63*b* of the cylindrical wall 63 between the second piston surface and the second end wall 66. The volumes of the piston side 61 and the rod side 62, as well as the lengths of the first and second cylindrical portions 63*a*, 63*b*, change as the hydraulic cylinder 60 extends and retracts.

Figure 3:
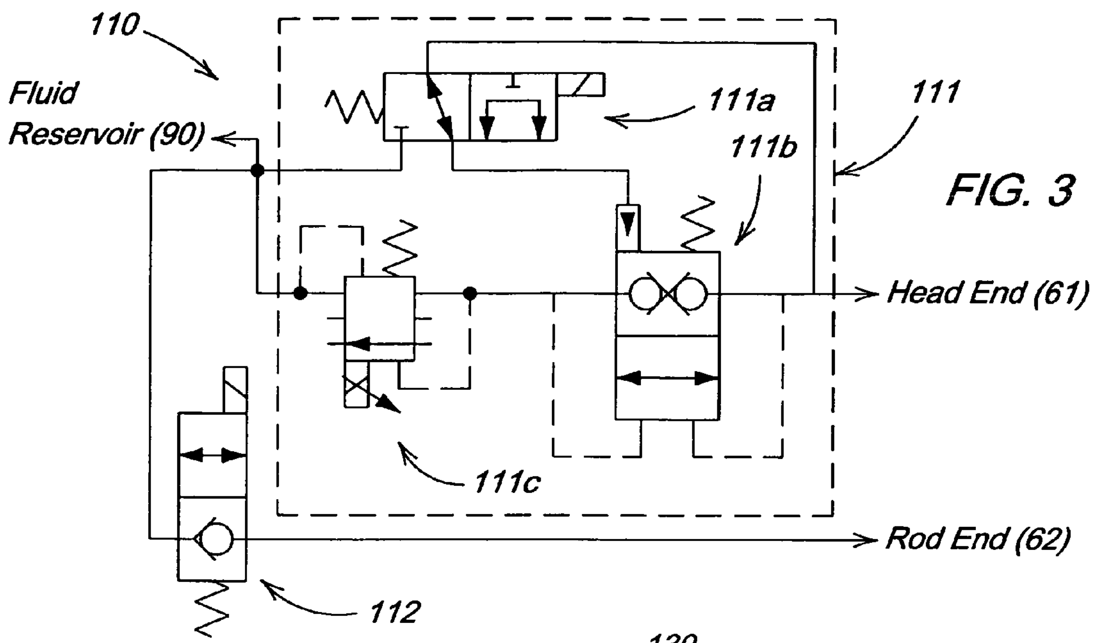
FIG. 3 is schematic of an exemplary embodiment of the ride control valve.

FIG. 3 is a schematic of an exemplary embodiment of the ride control valve 110. As illustrated in FIG. 3, this particular embodiment includes: a first valve portion 111 fluidly connected to the head end 61 and a fluid reservoir 90; and a second valve portion which includes one solenoid valve 112 fluidly connected to the rod side 62 and the fluid reservoir 90. The first valve portion 111 includes a two position three port E-H ride control activation valve 111*a*, a two position two port pilot controlled flow control valve 111*b*, and an E-H adjustable pressure relief valve 111*c* for adjusting ride control. The second valve portion includes an E-H shut off valve 112 that connects the rod end 62 to the fluid reservoir 90. The ride control valve 110 is fluidly connected to the piston side 61, the rod side 62 and the fluid reservoir at ports 110*a*, 110*b* and 110*c*, respectively.

Figure 4:
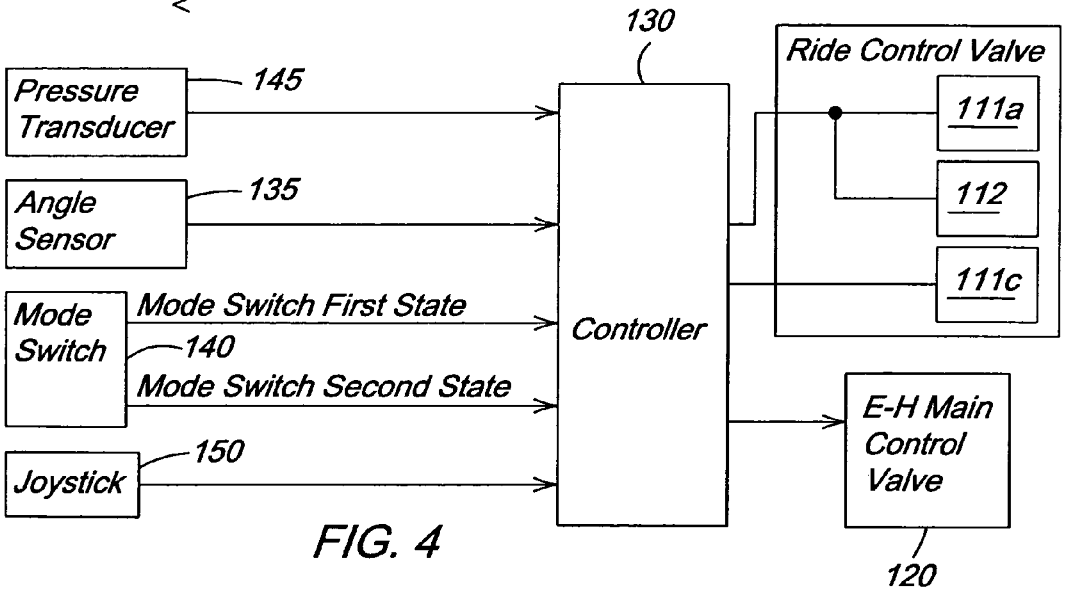
FIG. 4 is an illustration of an exemplary embodiment of the invention with respect to signals received and transmitted by the controller.

FIG. 4 illustrates the flow of signals received and distributed by the controller 130. As shown in FIG. 4, the controller 130 distributes control signals to the E-H main control valve 120 and the ride control valve 120 via the E-H ride control activation valve 111*a*, the E-H adjustable pressure relief valve, and the E-H shut off valve 112. The controller 130 bases the signals distributed on signals received from the pressure transducer 145, the angle sensor 135, the mode switch 140 and the joystick 150.

Figure 5:
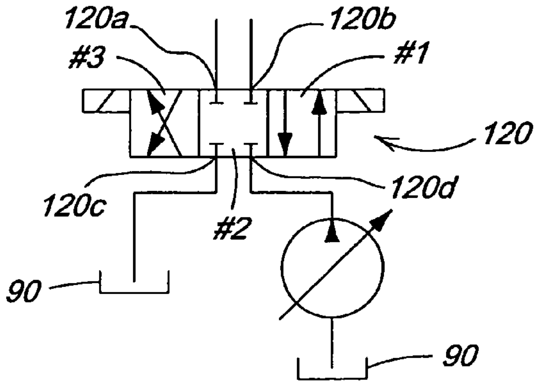
FIG. 5 is a schematic of an exemplary embodiment of the hydraulic pump and the E-H main control valve.

FIG. 5 is a schematic of a portion of the circuit in FIG. 2 illustrating the E-H main control valve 120 the variable hydraulic pump 125 and the fluid reservoir 90. The E-H main control valve 120 is a directional control valve well known in the art. The E-H main control valve 120 is fluidly connected to the piston side 61, the rod side 62, the hydraulic pump 125 and the fluid reservoir 90 at ports 120*a*, 120*b*, 120*c* and 120*d*, respectively, and is controlled by signals from the controller 130. Thus the E-H main control valve 120 is controlled via at least two modes: (1) the regular work mode in which ride control is not activated and the E-H main control valve 120 is operated as a simple directional control valve to accomplish normal work functions; and (2) a ride control mode in which the E-H main control valve 120 is used as a compliment to the ride control valve 110. Mode (2) will be fully explained shortly.

The controller 130 is a device well known in the art and may be a hard wired system, a system of relays or a digital electronic system. When the mode switch 140 is in the first mode switch state, the controller 130 controls the E-H main control valve 120 in the regular work mode via signals from an operator control 150. However, when the mode switch 140 is in the second mode switch state, the E-H main control valve 120 is controlled in accordance with mode (2), i.e. the ride control mode. An exemplary embodiment of the mode switch 140 is an operator controlled toggle switch which is well known in the art.

Figure 7:
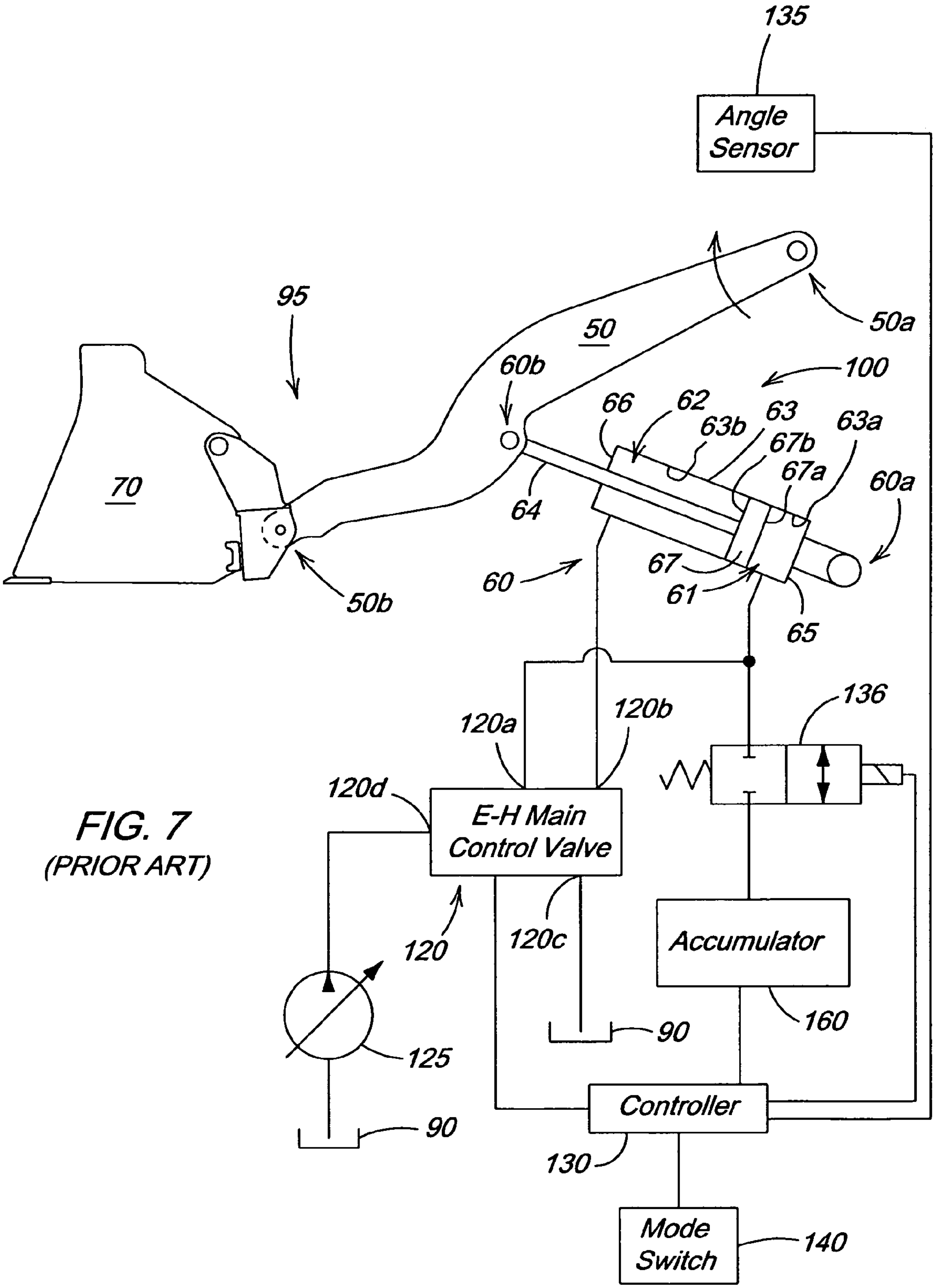
FIG. 7 (PRIOR ART)
FIG. 7 is an illustration of a system for ride control in the prior art which utilizes an accumulator.
Figure 8:
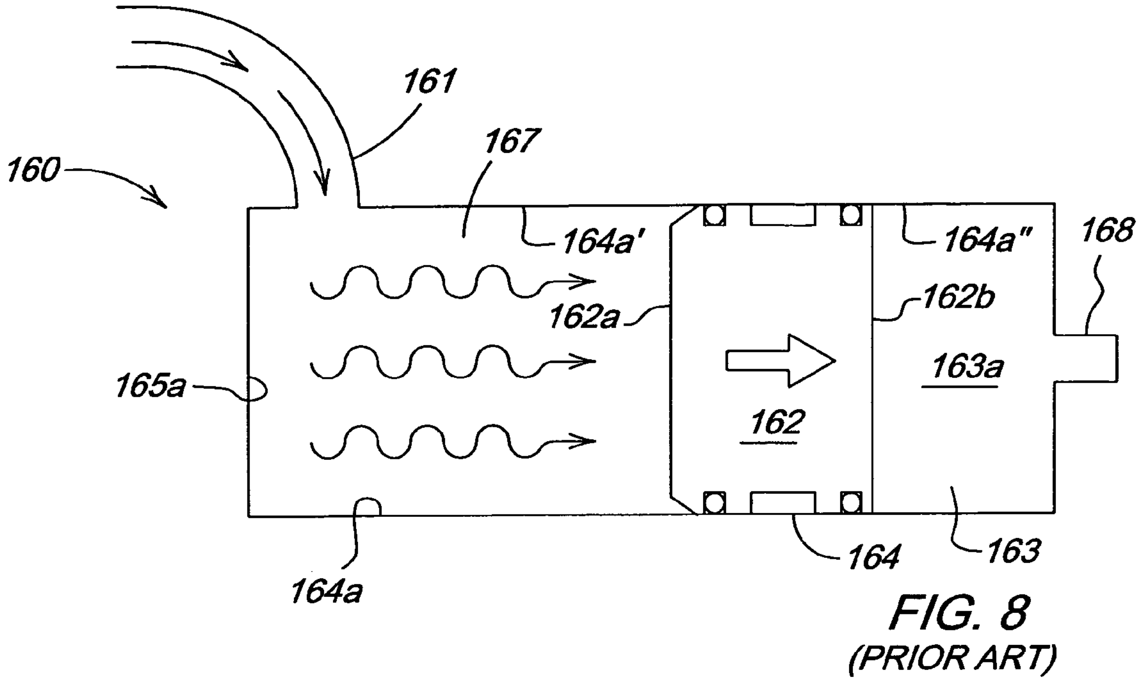
FIG. 8 (PRIOR ART)
FIG. 8 is an illustration of a prior art accumulator with a sufficient load applied.
Figure 9:
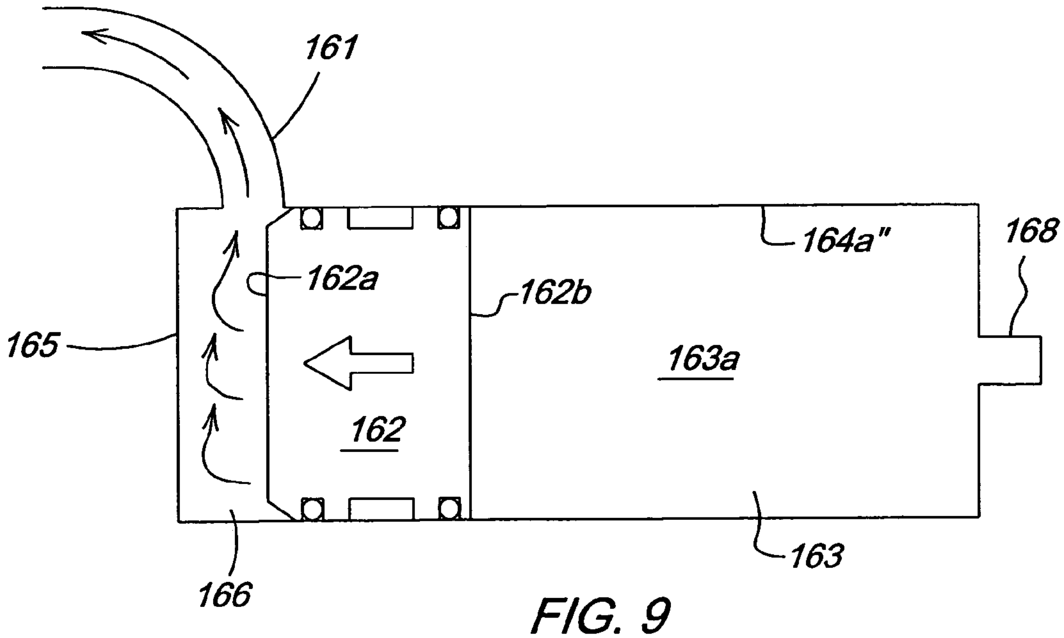
FIG. 9 (PRIOR ART)
FIG. 9 is an illustration of the accumulator of FIG. 9 with an insufficient load applied.

FIG. 7 illustrates a prior art hydraulic system which utilizes an accumulator 160 to achieve ride control. As shown in FIGS. 8 and 9, the accumulator 160 tends to be structurally complex and somewhat bulky. As illustrated in FIGS. 8 and 9, the accumulator 160 may include: an inlet port 161, a piston 162; a gas chamber 163 containing a gas 163*a*; a cylindrical accumulator wall 164 having an inner surface 164*a*; a first end wall 165 having an internal first end surface 165*a* which is inside the accumulator 160; a second end wall 166; and an accumulation chamber 167; and a gas inlet port 168. The accumulation chamber 167 includes: a first exposed cylindrical portion 164*a*' which is a portion of the inner surface 164*a* exposed to hydraulic fluid entering the accumulator 160; the first end wall 165 and the first piston surface 162*a*. The gas chamber 163 includes: the second end wall 166; the second piston surface 162*b*; and a second exposed cylindrical portion 164*a*" which is a portion of the inner cylindrical surface 164*a* that is exposed to the gas 163*a* and located between the second piston surface 162*b* and the second end wall 166.

A length of the second exposed cylindrical portion 164*a*" changes as pressurized fluid enters and leaves the accumulator 160. As hydraulic fluid enters the accumulation chamber 167, the volume of the gas chamber changes from a first volume $V_1$ to a second volume $V_2$ under a pressure of the hydraulic fluid as illustrated in FIGS. 8 and 9. As a result, a pressure of the gas 163*a* changes from a first pressure $P_1$ to a second pressure $P_2$ as the amount of gas is approximately a constant. Thus the accumulator pressure $P_A$ at any given time tends to follow the equation $P_A = P_2 = P_1 * V_1 \div V_2$. The accumulator pressure $P_A$ is approximately equals the fluid pressure $P_F$ in the accumulator 160.

Figure 6:
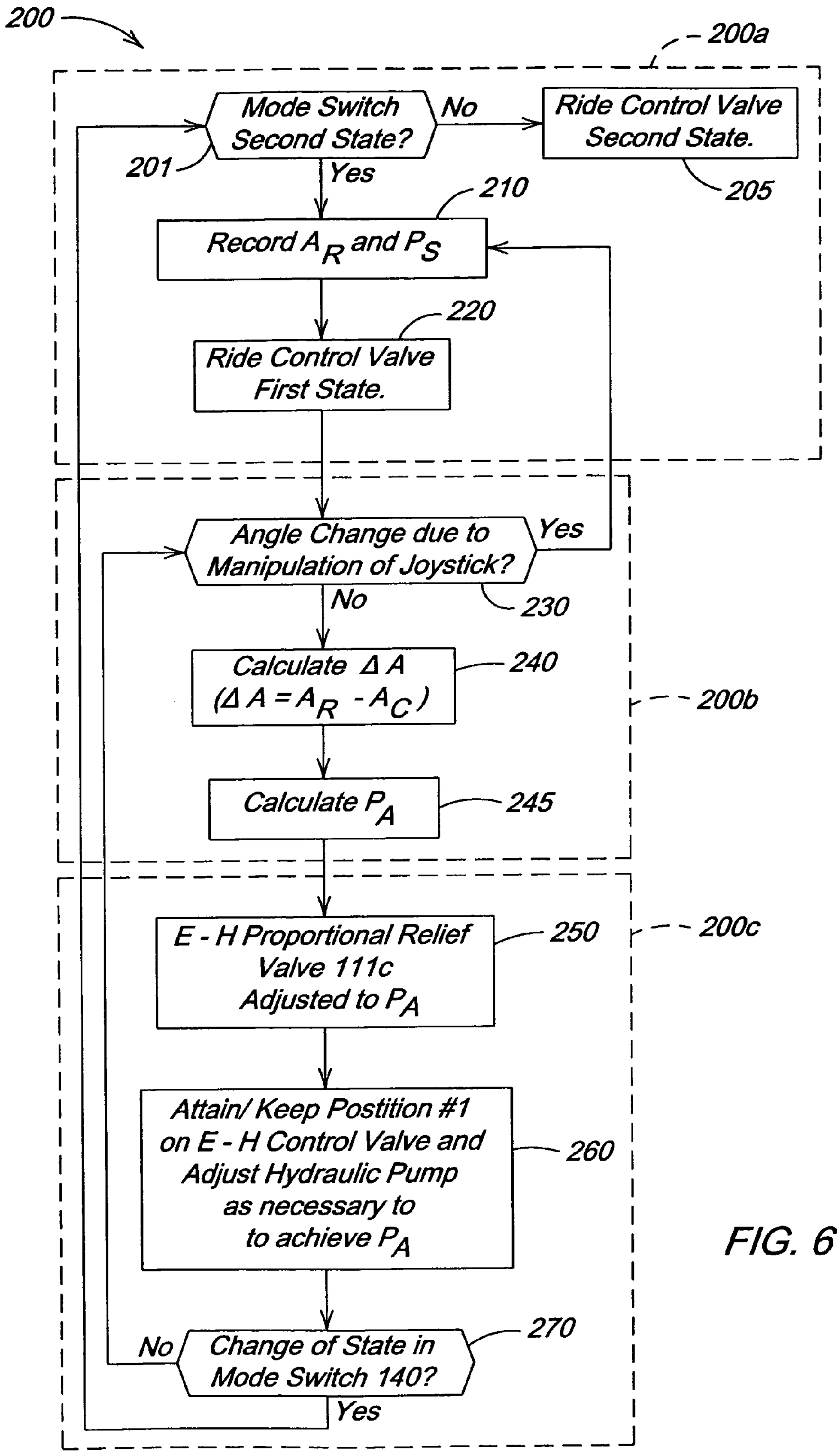
FIG. 6 is an exemplary embodiment of the algorithm followed by the controller to obtain ride control on demand.

FIG. 6 is an exemplary embodiment of an algorithm 200 for the invention, i.e., the alternative ride control system mentioned above. The process for this exemplary algorithm has essentially three parts: (1) mode setting 200*a*; (2) comparisons and calculations 200*b*; and adjustments 200*c*.

The mode setting 200*a* of the process begins at step 201 with a check for the state of the mode switch 140. If the mode switch 140 is not in the mode switch second state the process moves to step 205 and the ride control valve 110 is inactivated or remains inactivated if it is already inactive. If the mode switch is in the mode switch second state at step 201, the process moves to steps 210 and 220 where an angular value ($A_R$) is recorded from the angle sensor 135, an initial static pressure ($P_S$) is recorded from the pressure transducer and the ride control valve first state is implemented. The $P_S$ value is taken from filtered readings of the pressure transducer to reduce the chances of recording momentary spikes in pressure as illustrated in FIG. 4.

The comparisons and calculations 200*b* portion of the process starts immediately after the mode setting 200*a* and begins at step 230 determining if any change in boom angle was due to a manipulation of the joystick 150. If the angular change was due to a manipulation of the joystick 150, the process moves to step 210.

If, at step 230, the angular change is not due to joystick movement, the calculations begin. At step 240, an angular difference (ΔA) is calculated according to the following equation: $\Delta A = A_R - A_C$. ΔA and $P_S$ are, at step 245, then used to calculate a theoretical accumulator pressure ($P_A$) based on the accumulator model illustrated in FIGS. 8 and 9. The accumulator pressure ($P_A$) for this particular accumulator 160 is based on the change in the volume of the gas chamber 163 resulting from a displacement of the piston 162 as the amount of gas 163*a* in the gas chamber 163 remains constant. The displacement of the piston 162 is calculated from a movement of hydraulic fluid from the piston side to the accumulator sufficient in volume to cause the boom 50 to move through the angular change of ΔA. The accumulator pressure (PA) may be calculated differently when other accumulators are used.

The adjustments then begin at step 250 with adjusting the E-H proportional relief valve 111*c* to the calculated accumulator pressure ($P_A$). At step 260, the E-H main control valve 120 is then moved to or remains in position #1 and the hydraulic pump 125 is adjusted, as necessary, to achieve $P_A$. If, at step 270, there is no change of state in the mode switch 140, the process moves to step 230 and further adjustments are made as necessary. If the mode switch has changed states at step 270, the process moves to step 201.

Having described the illustrated embodiment, it will become apparent that various modifications can be made without departing from the scope of the invention as defined in the accompanying claims.

The invention claimed is:

1. A hydraulic circuit for a mobile machine, the mobile machine having a work tool, the hydraulic circuit comprising:

at least one hydraulic cylinder having a head end and a rod end;

a fluid pressure source;

a fluid reservoir;

a directional control valve fluidly connected to the head end, the rod end, the fluid pressure source and the fluid reservoir; and a ride control valve having a first ride control valve state and a second ride control valve state, the ride control valve fluidly connected to the head end, the rod end, the directional control valve and the fluid reservoir, the first ride control valve state automatically allowing fluid at the head end to flow toward the fluid reservoir when a fluid at the head end reaches a fluid pressure that is greater than a relief pressure at a first level, the work tool moving from a recorded first position to a second position as the fluid at the head end flows toward the fluid reservoir, the first ride control valve state allowing the ride control valve to automatically stop the fluid at the head end from flowing toward the fluid reservoir when the fluid pressure is less than the relief pressure, the directional control valve automatically allowing fluid from the fluid pressure source to enter the head end and move the work tool from the second position toward the first position when the ride control valve is in the first ride control valve state, the relief pressure being automatically adjusted to a second level, the second level being sufficiently high to move the work tool toward the first position.

2. The hydraulic circuit of claim 1, wherein the difference between the second level and the first level is proportional to an amount of the fluid flowing from the head end toward the fluid reservoir between the first position and the second position.

3. The hydraulic circuit of claim 1, wherein the first position comprises a first boom angle and the second position comprises a second boom angle.

4. The hydraulic circuit of claim 1, wherein the fluid pressure source comprises a hydraulic pump.

5. The hydraulic circuit of claim 4, wherein the hydraulic pump comprises a variable displacement hydraulic pump.

6. The hydraulic circuit of claim 5, wherein the variable displacement hydraulic pump is dynamically adjusted to achieve the relief pressure is dynamically adjustable.

7. The hydraulic circuit of claim 1, wherein the directional control valve comprises an electro-hydraulic valve.

8. The hydraulic circuit of claim 7, further comprising a controller, the controller automatically adjusting the relief pressure.

9. The hydraulic circuit of claim 8 wherein the controller dynamically adjusts the variable displacement pump to produce a fluid pressure at least at about the second level.

10. The hydraulic circuit of claim 8, wherein the controller comprises a digital computer.

11. The hydraulic circuit of claim 10, wherein the controller is programmable.

12. The hydraulic circuit of claim 10, wherein the controller adjusts the relief pressure, the electro-hydraulic valve, and the hydraulic pump to generate a pressure pattern that substantially improves a ride of the mobile machine.

13. A ride control system for a work vehicle, the work vehicle having a work tool, at least one hydraulic cylinder, a fluid reservoir, and a fluid pressure source, the hydraulic cylinder having a head end and a rod end, the ride control system comprising:

a directional control valve having a first directional control valve state and a second directional control valve state;

a ride control valve having a first ride control valve state and a second ride control valve state, the ride control valve comprising a proportional relief valve and a solenoid valve; and a controller having a first mode and a second mode, the first mode placing the first ride control valve in the first ride control valve state, the first ride control valve state allowing fluid at the head end to flow toward the fluid reservoir when a fluid at the head end reaches a dynamically set relief pressure, the work tool moving from a first position to a second position as the fluid at the head end flows toward the fluid reservoir, the first ride control valve state allowing the ride control valve to stop the fluid at the head end from flowing toward the reservoir when the fluid at the head end falls below the relief pressure at a first level, the controller adjusting the proportional relief valve to a relief pressure that is higher than the initial preset relief pressure in proportion to the volume of fluid flowing from the head end causing the directional control valve, in the first directional control valve state, to allow fluid from the fluid pressure source to flow to the head end and move the work tool toward the first position after it has moved to the second position, the second directional control valve state stopping fluid from flowing from the fluid pressure source to the head end, the controller capable of automatically changing a state of the directional control valve.

14. The ride control system of claim 13, wherein the second directional control valve state stops fluid from flowing from the fluid pressure source to the head end when the work tool has moved from the second position and approximately reached the first position.

15. The ride control system of claim 14, wherein the first position and the second position comprise a first boom angle and a second boom angle, respectively.

16. The ride control system of claim 14, wherein the controller comprises a programmable digital controller.

17. The ride control system of claim 14, wherein the controller automatically changes the state of the directional control valve when the ride control valve is in the first ride control valve state.

18. The ride control system of 17, wherein the controller automatically switches the directional control valve to the first directional control valve state after the work tool has moved to the second position and the fluid at the head end has fallen below the preset pressure.

19. The ride control system of claim 18, wherein the preset pressure is dynamically changed by the controller.

20. The ride control system of claim 18, wherein the controller is capable of varying the times at which it switches the directional control valve to the first directional control valve state.

21. The ride control system of claim 19, wherein the controller is capable of varying the times at which it switches the directional control valve to the second directional control valve state.

22. A work vehicle having a ride control system, a work tool, at least one hydraulic cylinder, a fluid reservoir, and a fluid pressure source, the hydraulic cylinder having a head end and a rod end, the ride control system comprising:

a directional control valve having a first directional control valve state and a second directional control valve state;

a ride control valve having a first ride control valve state and a second ride control valve state, the ride control valve comprising a proportional relief valve and a solenoid valve; and a controller having a first mode and a second mode, the first mode placing the first ride control valve in the first ride control valve state, the first ride control valve state allowing fluid at the head end to flow toward the fluid reservoir when a fluid at the head end reaches a dynamically set relief pressure, the work tool moving from a first position to a second position as the fluid at the head end flows toward the fluid reservoir, the first ride control valve state allowing the ride control valve to stop the fluid at the head end from flowing toward the reservoir when the fluid at the head end falls below the relief pressure at a first level, the controller adjusting the proportional relief valve to a relief pressure that is higher than the initial preset relief pressure in proportion to the volume of fluid flowing from the head end causing the directional control valve, in the first directional control valve state, to allow fluid from the fluid pressure source to flow to the head end and move the work tool toward the first position after it has moved to the second position, the second directional control valve state stopping fluid from flowing from the fluid pressure source to the head end, the controller capable of automatically changing a state of the directional control valve.

23. The work vehicle of claim 22, wherein the second directional control valve state stops fluid from flowing from the fluid pressure source to the head end when the work tool has moved from the second position and approximately reached the first position.

24. The work vehicle of claim 23, wherein the first position and the second position comprise a first boom angle and a second boom angle, respectively.

25. The work vehicle of claim 23, wherein the controller comprises a programmable digital controller.

26. The work vehicle of claim 23, wherein the controller automatically changes the state of the directional control valve when the ride control valve is in the first ride control valve state.

27. The work vehicle of 26, wherein the controller automatically switches the directional control valve to the first directional control valve state after the work tool has moved to the second position and the fluid at the head end has fallen below the preset pressure.

28. The work vehicle of claim 27, wherein the preset pressure is dynamically changed by the controller.

29. The work vehicle of claim 27, wherein the controller is capable of varying the times at which it switches the direction control valve to the first directional control valve state.

30. The work vehicle of claim 28, wherein the controller is capable of varying the times at which it switches the directional control valve to the second directional control valve state.

31. A method of achieving ride control for a work vehicle, the work vehicle including a ride control system, a work tool, a boom, at least one hydraulic cylinder, a fluid reservoir, and a fluid pressure source, the hydraulic cylinder having a head end and a rod end, the ride control system comprising: a directional control valve; a ride control valve, the ride control valve comprising a proportional relief valve and a solenoid valve; and a controller, the method comprising:

setting the ride control valve to a first relief pressure that allows fluid to flow from the head end at the first relief pressure;

recording a first boom angle;

allowing fluid to flow from the head end and, consequently, allowing the boom to move from the first boom angle to a second boom angle, the second boom angle placing the work tool at a lower position than the first boom angle;

adjusting the ride control valve to a second relief pressure that is sufficient to move the boom from the second boom angle toward the first boom angle;

opening the directional control valve to allow fluid from the fluid pressure source to flow into the head end at the second relief pressure;

closing the direction control valve to stop fluid from flowing from the pressure source to the head end when the boom has moved from the second boom angle to a boom angle that is approximately equal to the first boom angle.

32. The method of claim 31, further comprising adjusting the ride control valve to the first relief pressure after the boom has moved from the second boom angle to the first end.

* * * * *